INVENTOR
ROBERT KERR WARING, JR.

DRfBoyd

ATTORNEY

INVENTOR

ROBERT KERR WARING, JR.

BY [signature]

ATTORNEY

INVENTOR
ROBERT KERR WARING, JR.

BY D. R. Boyd
ATTORNEY 3,535,688

MAGNETIC BUFFER STORAGE

Robert Kerr Waring, Jr., Wilmington, Del., assignor to E. I. du Pont de Nemours and Company, Wilmington, Del., a corporation of Delaware Filed May 9, 1969, Ser. No. 823,293
Int. Cl. G11c *11/14, 13/04*
U.S. Cl. 340—174.1 13 Claims

ABSTRACT OF THE DISCLOSURE

A buffer storage system is described in which a magnetized hard magnetic member is used as a transducer to convert a pattern of transiently heated areas (preferably formed by radiant energy such as an electron beam or light) to transient magnetic signals which are transferred to and stored by a second magnetic member. The signals can be modulated by the heat input or, when a scanning mode is employed, also by a bias magnetic field. In a preferred embodiment, a binary magnetic mirror is employed as the storage element, the signals stored thereon being read out magneto-optically.

FIELD OF THE INVENTION

This invention relates to a method for transferring information with buffer storage.

SUMMARY OF THE INVENTION

The process of the present invention can be defined as a method for the transfer of information which comprises:

(i) Transiently heating a premagnetized first magnetic member in a pattern of discrete areas, said pattern representing information, said first magnetic member comprising a uniform layer of a hard magnetic material having a coercivity of at least 40 oe., said areas being heated to a temperature about the base temperature of the surrounding magnetic material, but below the Curie temperature of the said hard magnetic material, whereby the change of magnetization or changing the local temperature produces a transient magnetic signal field having a magnitude and direction corresponding to the said change of magnetization;

(ii) Changing the remanent magnetic state of a second magnetic member adjacent to and in the field of magnetic signals from said first magnetic member by a magnetic field comprising a bias field and the magnetic signal field of the first magnetic member, said second magnetic member comprising a layer of magnetic material having a coercivity substantially less than the said hard magnetic material of the said first magnetic member.

In a preferred embodiment of the invention, the second magnetic material is a magnetic mirror and the signals induced thereon are read out magnet-optically.

This invention also comprises apparatus which can be employed in the above process.

THE DRAWINGS

This invention will be better understood by reference to the accompanying drawings. In the drawings.

Figure 1:
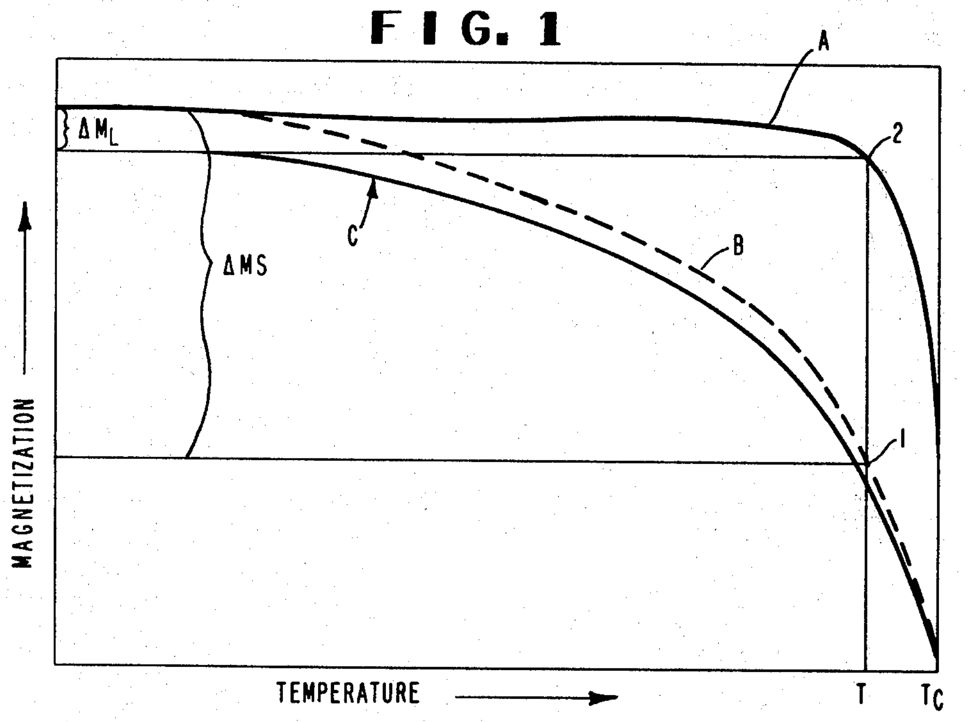
FIG. 1 shows a curve of the remanent magnetization after heating a magnetized hard magnetic material to a temperature T and then cooling to $T_0$, and curves showing the variation of magnetization of a magnetized magnetic material with temperature.

Referring now to FIG. 1, in this figure curve A shows the remanent magnetization, measured at $T_0$ of a magnetized hard magnetic material which has been heated to T and then cooled to $T_0$. The remanent magnetization is substantially constant with T until the Curie temperature $T_c$ is approached whereupon the remanent magnetization decreases rapidly to zero.

Curve B of FIG. 1 shows the magnetization of a magnetized hard magnetic material measured as a function of temperature. This curve also goes to zero with the Curie temperature, but, as shown in FIG. 1, decreases more uniformly with temperature than the remanent magnetization.

Consider a magnetic material of FIG. 1 which is formed into a plane magnetic member, remanently magnetized substantially to saturation, and then a small area is heated to temperature T. The magnetization of the small area decreases following curve B with temperature reading a value indicated by 1. On cooling, the magnetization returns to the value indicated by 2 according to curve A. There is then only a small percent change, $\Delta M_L$, in the magnetic state of the area, although a substantial change, $\Delta M_S$, occurs on heating and cooling. On reheating the same area to T, the magnetization follows curve C, but no further substantial loss if remanent magnetization occurs on recooling. The loss, $\Delta M_L$, can be made very small by suitable choice of a magnetic material, and by confining the heating cycle to temperatures below the Curie range of temperature at which a substantial loss in remanent magnetization occurs or by thermally precycling the first magnetic layer to the maximum temperature which is to be used.

The magnetic field external to a magnet is related to the divergence of the magnetization. For an infinite plane magnet uniformly magnetized to saturation in the plane there is no external field. When a small area is changed in magnetization, an external field is created, which is equivalent to that of a magnet having the dimensions of the area, and a magnetization equivalent to the change in magnetization of the area.

In practice, the magnetic members employed are not infinite or perfect and accordingly weak fields are present external to the surface of such a magnetized member. Nevertheless, a useful magnetic signal field can be obtained by transient heating of a small area of such a member. Such a magnetic member can, therefore, be regarded as a transducer for heat signals to magnetic signals. If a second magnetic member having a relatively low coercivity is placed in the field of such magnetic signals, the second magnetic member can be remanently magnetized by the signals, i.e., the transient magnetic signals are stored in the form of permanent magnetization on the second member. The magnetization of the second magnetic member can be read out at any selected time in a scanning mode or simultaneously, as will be discussed hereafter. The use of this phenomenom therefore provides a buffer storage for the information supplied by the heat signals.

The heat signals which are the direct input to the magnetic storage element can be supplied in a variety of ways, for example with a heated stylus. However, for speed of operation, radiant energy is the preferred method of providing the necessary heat. Further, the heat image corresponding to the information is lost by thermal diffusion. This can be minimized, or controlled by the duration of the heating which is most readily accomplished by using radiant energy. If heat diffusion is to be minimized, the duration of the heating should be small compared with the rate of diffusion. In practical systems, using high resolution areas, i.e., <0.001″, the duration of the heating should be about 10$\mu$ sec. As explained hereafter, controlled heat diffusion may be employed in the formation of half-toned images directly from continuous tone pictures. Accordingly, heating times of up to 10 milliseconds may be employed.

The information which can be transferred and transformed in the system of the present invention can assume a variety of forms including electronic signals such as binary digital information, television signals and the like, or photographic transparencies, documents, pictures, halftone plates and other matter which is intended for reading with the eye.

When the information is in the form of electronic signals, the heat can be conveniently supplied to the first magnetic member by an electron beam which is scanned over the surface of the member and also modulated in intensity by the signals.

When the information is in a form which can be read by eye, the image of the document, which may be suitably modified as explained hereafter is preferably projected onto the first recording member by a high intensity flash of light.

A preferred flash lamp for use in the process of the present invention is the xenon flash lamp.

Approximately 50% of the energy of the xenon flash lamps is in the visible, the other 50% is in the infrared. In imaging light, noninfrared absorbing colors it is desirable to use filters removing a portion of the infrared energy from the flash so that the material copied corresponds more nearly to the spectral sensitivity of the human eye. Corning infrared filter 1–59 containing iron in the ferrous state can be used to image a wide variety of colors and colored images on white or colored papers.

Figure 2:
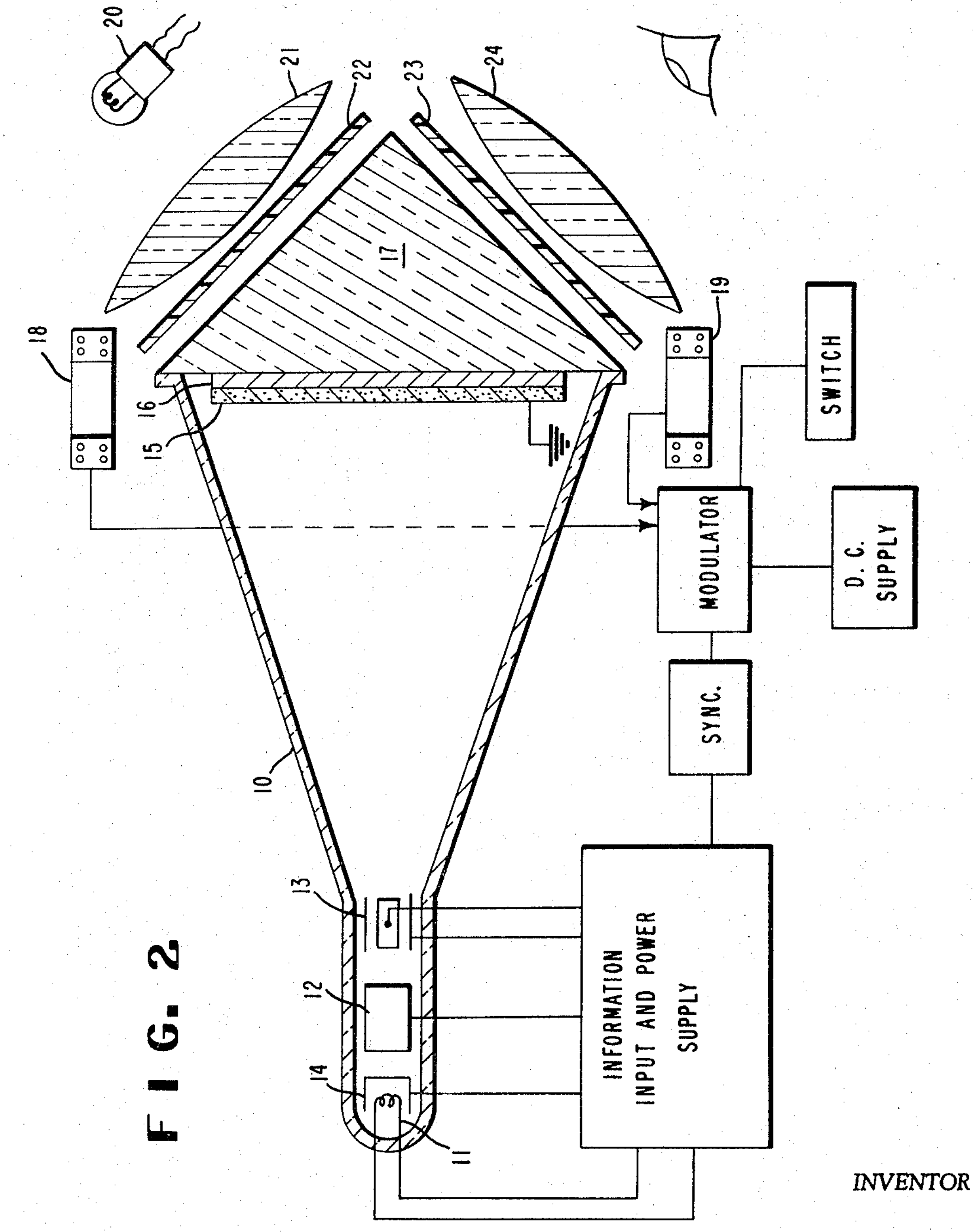
FIG. 2 shows an embodiment of this invention in which the first magnetic recording member is heated by an electron beam in accordance with information supplied by electrical signals, and employing magneto-optic read out of the second magnetic recording member.

FIG. 2 of the drawings shows an embodiment of the present invention in which signals are presented to the system in the form of electronic signals and read out as visual signals.

In this figure, a cathode ray tube 10 is employed as the principal component, which is shown in a simplified form.

An electron beam is formed by the cathode 11 and the anode 12 (which provides for beam focussing and acceleration of the electron, according to techniques well known in the art). The beam is electrostatically deflected vertically and horizontally by the deflector plates 13 and the intensity is modulated by the grid 14. Suitable electrical supplies are provided to form the electron beam and to modulate it spatially and intensity-wise in accordance with the information.

The beam falls on a compound recording member comprising a first magnetic member 15 which can be a layer of essentially single domain acicular particles of chromium dioxide about 80 microinches in thickness, which is bound to the second magnetic member in a binder. The particles are as uniformly dispersed as is feasible and are magnetically oriented with the easy axis of magnetization in the plane of the member and in the plane of the section shown in FIG. 2. This may be accomplished by techniques which are familiar in the art of making magnetic recording tape.

In order to provide for removal of the currents generated by the electron beam, the first magnetic member should be electrically conductive and should be earthed or other provisions made to prevent the accumulation of charge on the member. Chromium dioxide has sufficient electrical conductivity for this purpose, but if other magnetic materials are employed which do not have sufficient electrical conductivity, conductive materials such as electrically conductive carbon black or metal powder may be incorporated in the binder with the magnetic material to supply the desired conductivity and the second magnetic member may be used as a metallic film with the first magnetic member in direct contact therewith to provide for the removal of the charge.

The first magnetic member in the embodiment illustrated is formed directly on the second magnetic member 16 which in the embodiment of FIG. 2 is a magnetic mirror suitably a film of iron metal deposited by vapor deposition on an optical prism 17, which forms the face of the cathode ray tube. In general, because the magnetic original field is weak the first magnetic layer should be extremely close to the second magnetic layer.

Coils 18 and 19 having the axis directed above the plane of the member are provided for premagnetization of the members, and for modification of the magnetization of the second member. Suitable power supplies for these coils are also provided.

The read-out is accomplished magneto-optically. For this purpose there is provided a lamp 20 and a lens 21 to collimate the light from the lamp and direct it to the magneto-optic surface. The incident light is polarized by a polarizer 22 which can be a sheet of Polariod® or the like when a high efficiency magneto-optic surface is employed, or a Glan-Thomson prism. The light reflected from the surface passes through an analyzer 23 which is of the same character as the polarizer 22 and is set close to extinction. The mangeto-optic image is viewed through a field lens 24.

In using the apparatus in FIG. 2, the magnetic recording members are first prepared to receive the signals. A heavy current, which may be in the form of pulse, is passed through coils 18 and 19 to produce a magnetic field directed along the plane of the members 15 and 16 and having an intensity sufficient to magnetize the first magnetic member 15 essentially to saturation. The direction of magnetization of the second magnetic recording member 16 is then reversed by passing a pulse of current through coils 18 and 19 in the opposite sense to the first magnetizing pulse and having the intensity sufficient to reverse the magnetization of the low coercivity member 16 while leaving the high coercivity magnetic material of the first member 15 substantially unaffected. If desired a permanent pattern of magnetization can now be impressed on the first magnetic recording member by writing in with the electron beam using a current density sufficient to raise the temperature of the magnetic material composing the first magnetic recording member to a temperature above the Curie temperature whereby the pattern so written is permanently demagnetized or reversed. For example, the lines of a graph, column lines, and the like, can be impressed which are permanent in the sense further information can be added and erased repeatedly without affecting the permanent information. Of course, such permanent information can be removed by remagnetization of the entire assembly as described above. The beam current is now reduced to a level sufficient to heat the first magnetic member 15 to a sufficiently elevated temperature to provide a magnetic signal field but below the Curie range of temperature and is then deflected and modulated in accordance with the information which it is desired to impose on the magnetic elements. The magnetic signals created by the transient heating of the member 15 are transferred to and stored on member 16. The transfer may be aided by a D.C. bias field or an A.C. field, or both, supplied by coils 18 and 19 according to methods which are well known in the art. Likewise, information supplied by the magnetic signal field can be wholly or selectively suppressed by adjustment of the D.C. bias field, e.g., when the information is supplied in the form of raster scanned of the electron beam on the magnetic member 15, flyback can be suppressed without changing the beam current by a suppressing D.C. bias field in synchronization with the flyback.

The information which is written on the member 16 can be supplied with a single raster scan, a number of raster scans, or randomly. It is cumulatively collected on the member 16 and stored for as long as desired. The information can then be erased by application of a D.C. field opposed to the magnetization of the member 15 and having a strength sufficient to remagnetize member 16 but insufficient to reverse the magnetization of member 15. The information can be erased manually by a suitable switching means or by erasing pulses supplied with the information when each message is completed. On so erasing, any pattern of permanent magnetization on the member 15 on which has been imposed a Curie point writing immediately reappears on member 16.

The common magneto-optic surfaces have a binary character so that continuous tone images cannot be represented by continuous variations in the magnetization of the magneto-optic surface. Continuous tone pictures can be represented by half-toning techniques such as are employed in the graphic arts. The half-toning can be supplied by the form of the electrical signals presented to the system. Further, as will be disclosed hereinafter, it is possible to operate the system so that intensity modulation of the electron beam is presented as an area modulation on the magnetic member 16.

Figure 3:
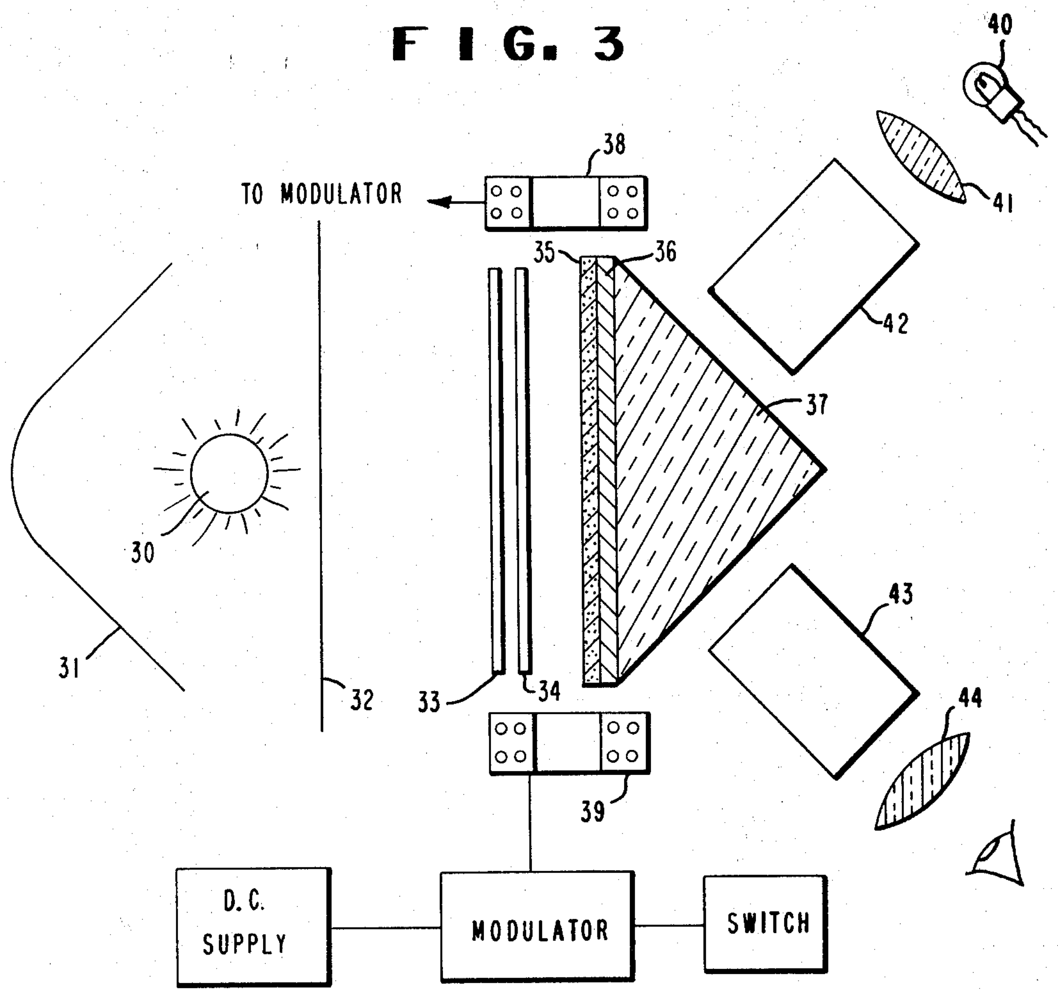
FIG. 3 shows another embodiment of this invention in which heat is applied to the first recording member by a flash of light modulated by a document and a screen, and the resultant pattern of magnetization of the second magnetic layer is read out magneto-optically.

FIG. 3 shows another embodiment of the present invention wherein the energy to heat the first magnetic member is supplied by visible light. In this figure, 30 is a xenon flash lamp with an appropriate power supply (not shown). A reflector 31 is provided and if desired an optical filter 32 is employed to eliminate unwanted portions of the spectral output of the lamp 30. The light from the lamp 30 passes through a half-tone screen 33 and the photographic transparency 34 and thereafter strikes the compound reccording member comprising the first magnetic member 35 and a second magnetic member 36 which are formed on the base of an optical prism 37 substantially as described in connection with FIG. 2 except that electrical conductivity is no longer essential for the first magnetic member. Coils 38 and 39 together with their associated power supplies are provided to produce the necessary fields for magnetizing the recording members 35 and 36, as described in connection with FIG. 2. The magnetic image formed on the magnetic mirror 36 and stored thereon is read out with lamp 40, collimating lens 41, polarizer 42 and analyzer 43 and the field lens 44 also is described above in connection with FIG. 2.

The apparatus of FIG. 3 can be used to provide a flicker-free framing mechanism for motion picture film. Thus the photographic transparency of 34 can be a continuously moving motion picture film. Lamp 30 is flashed as each frame of the motion picture film is positioned before the magnetic recording member in accordance with synchronizing pulses generated by a track on the side of the film. The resultant image is retained on the magneto-optic surface for viewing until erased and the next image presented in accordance with the synchronizing pulses. The duration of the imaging flash can readily be made sufficiently short to stop the motion of the film in all reasonable film speeds and to eliminate flicker.

Figure 4:
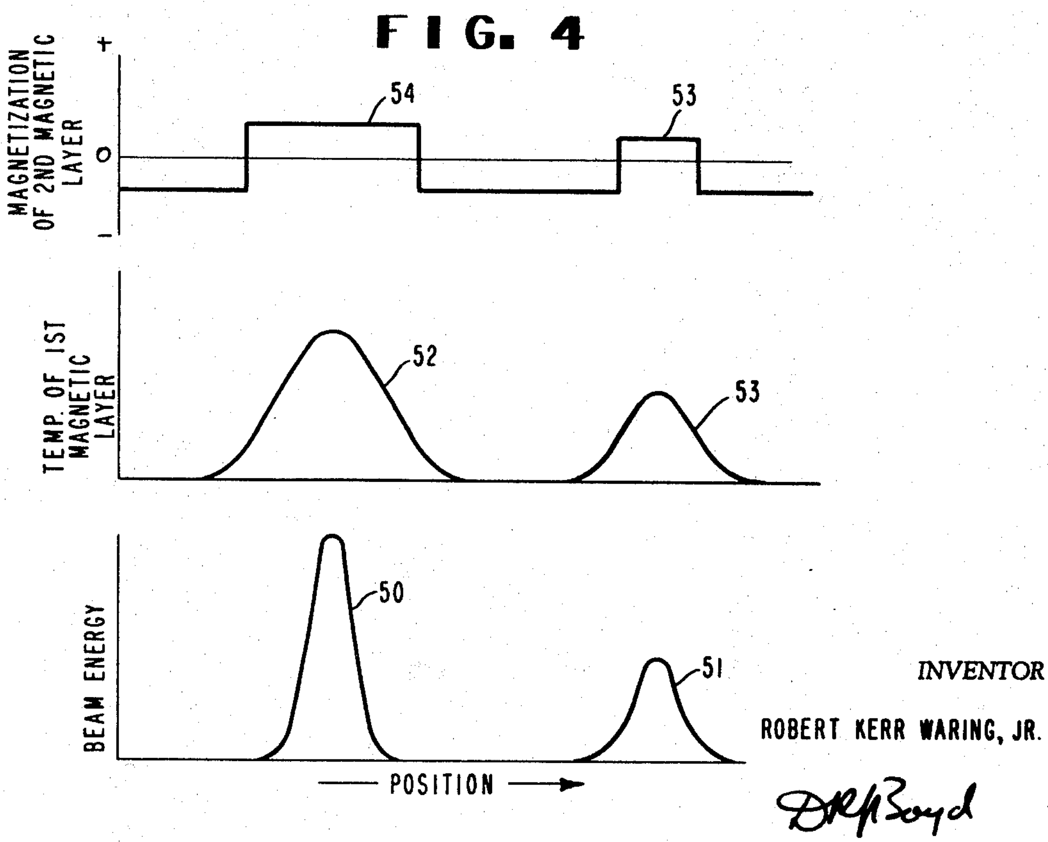
FIG. 4 is a diagram to show how the intensity of a beam of light can be converted to a spatial modulation of the magnetic image produced on the second recording member.

Referring now to FIG. 4, in that figure there are shown graphs illustrating the various factors affecting the transfer of information from the heating means to the second magnetic layer. In the lower part of the figure there is plotted the beam energy of the radiant energy used to heat the first magnetic layer as a function of position on a line drawn through equal areas which are heated to different degrees by the beam. Due to diffraction effects and imperfections in the apparatus, a cross section of the beam energy generally assumes the form such as that shown by 50 and 51. The resultant temperature profile where the beam impinges on the magnetic recording member is also plotted in FIG. 4. Due to thermal diffusion, the heat image does not correspond with the profiles of the beam energy but is spread to a degree which depends on the time of the transient heating and the magnitude thereof. The magnetic field generated by the heating is greater for the more intensely heated area 52 than for the lesser area 53. Accordingly, the contours of equal magnetic field strength are further spread for the more strongly heated area 52 than for the area 53. The second magnetic layer is switched from the initial direction of magnetization to the opposing direction when the magnetic signal field plus the bias exceeds the coercivity. By applying a constant magnetic field bias, such that the second magnetic layer is switched at a small predetermined fraction of the maximum signal field strength generally from about 5 to about 30 percent of the maximum signal field strength, the area which is switched is roughly proportioned to the intensity of the incident beam radiation. Of the above factors, the bias level and the effect of thermal diffusion can be controlled readily. The D.C. bias level can be set by the current passing in the magnetizing coils. The thermal diffusion can be controlled by controlling the time in which each area is exposed to the beam of radiation, longer times with corresponding lower beam intensities producing greater thermal diffusion than shoter times. Thus, a continuous tone picture may be transformed to a half-tone picture by sampling the picture in a pattern of uniform small areas which are reproduced on the second magnetic layer as an area of reversed magnetization roughly proportioned to the intensity in each sampled area. This technique can be applied either with electron beam read in or when visible light is employed to image a document onto the first magnetic layer.

From the foregoing, it will be apparent that the first magnetic layer must absorb radiation to be heated thereby; further, the magnetic layer should be capable of a continuous change of magnetization over a small area to a substantial degree. The first magnetic layer should also be capable of uniform magnetization to produce a minimum external field. In order to produce a large change of magnetization on heating, it is preferred that the upper temperature limit should be close to the Curie range of temperature when ferromagnetic materials are employed or to the magnetic compensation temperature when the ferromagnetic materials are used.

A particularly outstanding species of magnetic material which can be used in making the first magnetic layer is chromium dioxide ($CrO_2$). This material can be used in substantially pure form or modified with one or more reactive elements. The term, chromium dioxide, as used in this application, is specifically inclusive of the pure form and modified forms. Suitable descriptions of both the process of preparation and compositions which have the necessary properties will be found in the following illustrative list of issued U.S. patents: Arthur, U.S. 2,956,955; Arthur and Ingraham, U.S. 3,117,093; Cox, U.S. 3,074,778; U.S. 3,078,147; U.S. 3,278,623; Ingraham and Swoboda, U.S. 2,923,683; U.S. 2,923,684; U.S. 3,034,988; U.S. 3,068,176 and Swoboda, U.S. 2,923,685. For pure $CrO_2$ the Curie temperature is near 119° C. This varies somewhat depending on the modifiers used in the synthesis of $CrO_2$. The Curie temperatures in the range of 70° C. to 170° C. are easily obtainable with modified $CrO_2$. This range of temperature is conveniently accessible for the introduction of permanent information on the first magnetic layer and also provides a convenient temperature range in which large transient changes in magnetization can take place. Chromium dioxide, when in the desired particulate preferably acicular form has a relatively high coercivity and relatively high remanence. Finely particulate chromium dioxide further absorbs light uniformly throughout the region of the visible spectrum, i.e., it is black to the exposing light. It is also suitable for use with electron beams since it is electrically conductive. Other magnetic materials in the form of fine particles having Curie temperatures preferably below 500° C. and suitably high coercivities can be employed. It is also possible to use materials in the form of thin films, preferably having the direction of easy magnetization in the plane of the film. If the film is highly reflective to the radiation which is employed to heat it, it may be desirable to coat the film with a layer of absorbing and preferably non-magnetic powder such as carbon black to increase the absorption of the radiation.

In the above embodiments, the second magnetic layer was a magnetic layer used for magneto-optic read out which has binary characteristics. It is also possible to use as the second magnetic layer a finely particulate magnetic material, the magnetization of which can be changed substantially continuously in response to the signals generated by the first magnetic layer transducer. It is desirable that the second magnetic layer has a coercivity substantially less than that in the first magnetic layer, in order that its magnetic state may be changed by the application of external fields without substantially affecting the state of magnetization of the first magnetic layer. Further, it should have a sufficiently high Curie temperature so that any heat conducted from the first magnetic layer will not demagnetize the images formed on the second magnetic layer. In addition to magneto-optic read out, other methods of reading out magnetic signals on a recording member which are well known to those skilled in the art can be employed.

Many other modifications and variations of the present invention will be apparent to those skilled in the art. Thus, in all of the applications described thus far, switching occurs in one direction only so as to reverse incremental regions of the premagnetized second magnetic layer. For many applications, it is desirable that information stored on the second magnetic layer can be selectively erased by the application of a reverse polarity area of field. When a scanning mode is employed as with electron beam read in, the desired reverse field in the scanning spot can be achieved by thermally biasing a region along the direction of premagnetization about the scanning spot to an intermediate temperature between the extremes of temperature employed, whereby the sense of the field is changed according to whether the central spot is heated above or below the bias temperature. The surface field from the surrounding bias area is relatively small because of the relatively large size and can be cancelled by an appropriate external bias field. One method of providing a uniformly thermally biased region about the central scanning spot is to superimpose a high frequency oscillation on the electron beam which is thereby scanned parallel to the direction of premagnetization.

The deflection oscillation voltage is also employed to switch from a thermal bias control grid voltage source to an information intensity voltage source to the grid during the travel of spot over a small region about the center of the oscillation. In this way the temperature is maintained essentially constant outside the central region and is controlled above or below that tempertaure by the information when the spot is in the central region.

In order that the spot field should be reasonably symmetrical in its leading and trailing edge, the heat balance is maintained, that is the thermal contact of the first magnetic layer with its surroundings is such that heat is lost at about the same rate that it is introduced by the beam.

In addition to locally biasing a region thermally around the information containing heating means, the entire magnetic member may be thermally biased either above or below ambient temperature in order to secure more favorable operating conditions. In addition to conventional heating or cooling means applied to the entire apparatus, when the first magnetic layer is electrically conductive, thermal bias can be accomplished by passing a constant current through the first magnetic layer.

The apparatus of the present invention is useful for a variety of applications in which information is received at one rate and read out at another. For example, a large amount of electronic information is required in order to transmit a picture. When the band pass available to transmit this information is narrow the acquision of all the information required to form the complete picture may take a considerable time period. Using the buffer storage system of the present invention with electron beam read in, the information may be stored on the second magnetic layer as it is received. It may be examined at any stage of the transmission and when transmission is complete, may be read out instantaneously or substantially so. Likewise, information which is received in an extremely high rate of transmission may be retained on the second magnetic layer for examination by slower methods of read out, e.g., by reading with the human eye.

The embodiments of the invention in which an exclusive property or privilege is claimed are defined as follows:

1. A method for the transfer of information which comprises:

(i) transiently heating a premagnetized first magnetic recording member in a pattern representing information, said first magnetic recording member comprising a uniform layer of hard magnetic material having a coercivity of at least 40 oe., said pattern being heated to a temperature about the base temperature of the surrounding magnetic material, but below the Curie temperature thereof whereby the change of magnetization on change of the local temperature produces a transient magnetic signal field having a magnitude and direction corresponding to the change of magnetization; and (ii) changing the remanent magnetic state of the second magnetic recording member adjacent to said first magnetic member by a magnetic field comprising the magnetic signal field of the first magnetic member and a bias field, said second magnetic recording member comprised of a layer of magnetic material having a coercivity substantially less than the said hard magnetic material of said first magnetic member.

2. Method of claim 1 which comprises the additional step of reading out the information recorded magnetically on the said second magnetic recording member.

3. Method of claim 2 in which the first premagnetized recording member is heated by an electron beam modulated in accordance with said information.

4. Method of claim 3 in which the second magnetic recording member is a magnetic mirror and the information recorded on said second magnetic recording member is read out magneto-optically.

5. Method of claim 2 in which the first magnetic recording member is heated by a flash of light modulated by a document.

6. Method of claim 5 in which the second magnetic recording member is a magnetic mirror and the information recorded on said second magnetic recording member is read out magneto-optically.

7. Method of claim 5 in which said document is a halftone transparency and said flash of light is modulated by transmission through said transparency.

8. Method of claim 7 in which the second magnetic recording member is a magnetic mirror and the information recorded on said second magnetic recording member is read out magneto-optically.

9. Apparatus for the transfer of information which comprises:

a compound magnetic recording member comprising a first hard magnetic layer having a coercivity of at least 40 oe. and a second magnetic layer having a substantially lower coercivity, the said second magnetic layer being within the field of magnetic signals generated by said first magnetic layer;

means adapted and arranged to magnetize said compound recording member;

means adapted and arranged to modify the magnetization of said second magnetic layer;

heating means adjacent to said first magnetic layer to transiently heat magnetic areas of said first magnetic layer whereby a transient magnetic signal is produced at said areas by the thermal variation of the magnetization;

means to remanently magnetize said second magnetic layer comprising said transient magnetic signals and magnetic bias means; and means to modulate said heating means and said magnetic bias means in accordance with the said information.

10. Apparatus of claim 9 additionally comprising means to read out the remanent magnetization of said second magnetic layer.

11. The apparatus of claim 10 in which said second magnetic layer is a magnetic mirror and the magnetization of said second magnetic layer is read out magneto-optically.

12. Apparatus of claim 11 in which said heating means comprises an electron beam modulated in accordance with said information.

13. Apparatus of claim 11 in which said heating means comprises a flash of light from a xenon lamp modulated by a document.

References Cited

UNITED STATES PATENTS

| | | | |
|---|---|---|---|
| 3,164,816 | 1/1965 | Chang | 340—174.1 |
| 3,229,273 | 1/1966 | Baaba | 340—174.1 |
| 3,368,209 | 2/1968 | McGilauchlin | 340—174.1 |

TERRELL W. FEARS, Primary Examiner

U.S. Cl. X.R.

340—174